Jan. 22, 1935.    A. D. MACLACHLAN    1,988,600
SAFETY DEVICE FOR OIL AND FUEL PIPES
Filed Sept. 20, 1930
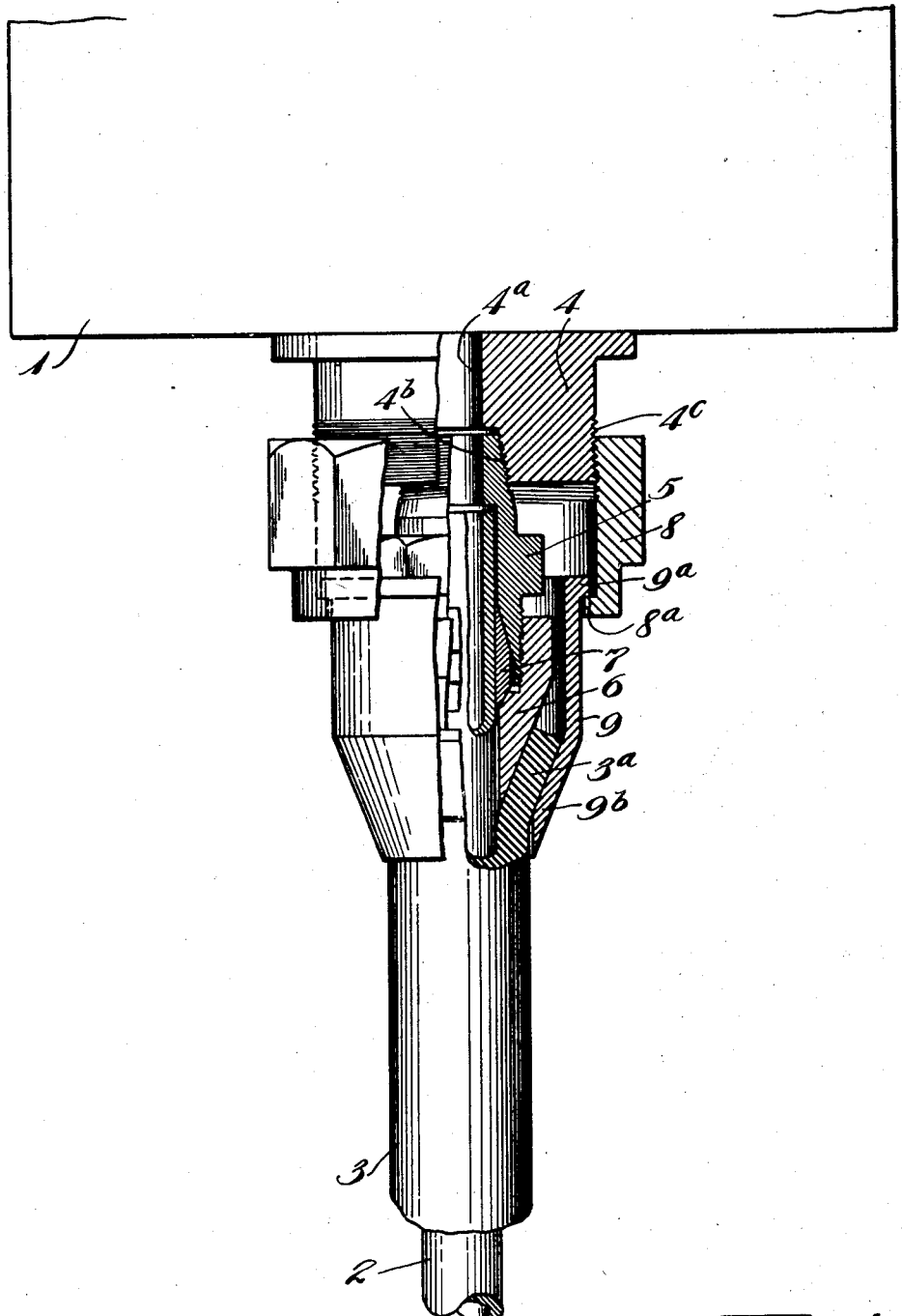
Inventor
Andrew D. MacLachlan
By Eakin & Avery
Attys Patented Jan. 22, 1935

1,988,600

UNITED STATES PATENT OFFICE 1,988,600

SAFETY DEVICE FOR OIL AND FUEL PIPES

Andrew D. Maclachlan, Akron, Ohio, assignor to The B. F. Goodrich Company, New York, N. Y., a corporation of New York Application September 20, 1930, Serial No. 483,274

2 Claims. (Cl. 285—72)

My invention relates to the protection of oil and fuel lines such as are used on internal combustion engines and the like for providing fuel and lubricating fluids.

It is common practice to use light metallic tubing for such lines due to the fact that it is lighter in weight than standard pipe and fittings and may be easily bent to connect engines and tanks with a minimum amount of fittings or joints. Copper or copper alloys are ordinarily employed for this purpose although other metals are sometimes used. The greatest difficulty experienced in the use of such tubing is the fact that all metals become crystallized and brittle when subjected to vibration over a long period of time and tubing made therefrom may crack or break while in use. Such failures are disastrous in that where used for fuel lines, the fuel supply may entirely fail or leakage of fuel may create fire hazards causing loss of human life and equipment, and where used for lubricating oils, failure of lubrication may cause serious damage to the machines.

My invention has for its principal object to prevent the leakage of fluids from such tubing in case of failure of the metal by providing a protective covering for the tubing;

Another object of my invention is to provide suitable connections for sealing the protective covering to the parts connected by the metal tubing.

Other objects will be apparent from an examination of the following description and claims:

In order to prevent damage due to failure of the metal pipe lines I propose to enclose such pipe in soft rubber tubing which may be vulcanized to the pipe. I find that the rubber tubing dampens vibrations and thereby prolongs the life of the metal tubing. Should the metal tubing fail through vibration or other causes, the rubber tubing will act as a conduit, which will take the place of the metal tube, at least until proper repairs can be made. Ordinary rubber tubing may be used for this purpose and should preferably snugly embrace the metal tubing to produce the best vibration dampening results.

Various means of fastening the ends of the rubber tube may be used but in any case the ends should be fastened to the pipe or connected structures so that leakage of fluid will not take place should failure of the metal pipe occur.

In the accompanying drawing I have shown a type of fitting which I have designed to serve the purpose of sealing the ends of the rubber tubing. Referring to the drawing, 1 indicates either a tank or other piece of apparatus or fluid container to which it is desired to connect a metallic fluid conduit or pipe 2 and a protective rubber cover 3. I have shown the apparatus 1 as provided with an integral extension or boss 4 having a central bore $4^a$ and a tapered threaded aperture $4^b$ connecting therewith. The metal tube 2 is operatively connected to the boss 4 by a nipple 5 engaging the aperture $4^b$ and provided with a gland nut 6 and a gland packing 7 which embraces the pipe 2. These parts which constitute a union nipple connection may be of any desired construction but I prefer the type shown in which the gland packing 7 comprises a ring of soft metal having conical ends designed to be engaged by conical surfaces on the nipple 5 and gland nut 7 whereby it is distorted to closely embrace the pipe 2.

In order to seal the rubber protective covering 3, I telescope the ends thereof as a $3^a$ over the outer conical surface of the gland nut 6. I provide a union nut 8 engaging a threaded portion $4^c$ of the boss 4, and provided with an internal annular flange $8^a$. I also provide a thimble 9 having at one end an outward flange $9^a$ designed to overlap the flange $8^a$, and at the other end a conical portion $9^b$ surrounding the telescoped portion $3^a$ of the protective cover. The union nut 8 may be screwed toward the boss 4 and will compress the rubber cover 3 between the gland nut 6 and the thimble 9 to effectually seal the rubber cover. It will be noted that due to the flanges $8^a$ and $9^a$ engaging each other the union nut 8 may be turned without turning the thimble 9 on the rubber and any abrading of the rubber is thereby avoided. When it is desired to remove the connection no difficulty is experienced with such a construction as would occur if it were necessary to turn the metal thimble on the rubber.

I claim:

1. A device for attaching a rubber covered smooth-walled metal tube to a fitting, said device comprising a smooth-bored union nipple extending from said fitting and adapted to receive the end of the metal tube, a gland nut threaded over said nipple and formed with an internal conical packing seat and an external conical surface, a packing adapted to surround the pipe and to be compressed thereagainst between said nipple and said gland nut to seal the pipe, a union nut threaded to said fitting, and a thimble retained by said union nut and having an internal conical surface to engage the rubber covering and clamp it against the outer conical surface of said gland nut to seal said covering.

2. A device for coupling a rubber covered smooth-walled metal tube to a fitting, said device comprising a smooth-bored union nipple extending from said fitting and adapted to receive the end of the metal tube, a distortable conical soft metal bushing adapted to be slipped over the pipe and to be seated in said nipple, a gland nut threaded over said nipple and adapted to contact said bushing and formed with a conical outer wall, a union nut threaded over said fitting, a thimble retained by said union nut and formed with an internal conical surface adapted to engage the outer surface of the rubber covering and clamp it against the conical surface of the gland nut to seal the rubber covering.

ANDREW D. MACLACHLAN.